(12) United States Patent  
Sugita et al.

(10) Patent No.: US 9,342,183 B2  
(45) Date of Patent: May 17, 2016

(54) TOUCH PANEL EQUIPPED DISPLAY DEVICE AND DRIVING METHOD FOR THE SAME

(75) Inventors: Yasuhiro Sugita, Osaka (JP); Shinji Yamagishi, Osaka (JP); Kazutoshi Kida, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 44 days.

(21) Appl. No.: 14/001,544

(22) PCT Filed: Feb. 23, 2012

(86) PCT No.: PCT/JP2012/054380  
§ 371 (c)(1),  
(2), (4) Date: Aug. 26, 2013

(87) PCT Pub. No.: WO2012/117928  
PCT Pub. Date: Sep. 7, 2012

(65) Prior Publication Data  
US 2013/0335374 A1  Dec. 19, 2013

(30) Foreign Application Priority Data  
Mar. 1, 2011  (JP) .................................. 2011-044380

(51) Int. Cl.  
*G06F 3/041* (2006.01)  
*G06F 3/044* (2006.01)

(52) U.S. Cl.  
CPC .............. *G06F 3/0418* (2013.01); *G06F 3/044* (2013.01); *G06F 3/0412* (2013.01); *G06F 3/0416* (2013.01); *G06F 2203/04112* (2013.01)

(58) Field of Classification Search  
CPC ..................................................... G06F 3/0418  
USPC ............................................................ 345/173  
See application file for complete search history.

(56) References Cited

U.S. PATENT DOCUMENTS

| | | | |
|---|---|---|---|
| 6,452,514 B1 | 9/2002 | Philipp | |
| 2002/0089491 A1* | 7/2002 | Willig | 345/173 |
| 2006/0055680 A1* | 3/2006 | Okazaki | 345/173 |
| 2008/0062147 A1* | 3/2008 | Hotelling et al. | 345/174 |
| 2011/0115733 A1* | 5/2011 | Shih | 345/173 |
| 2011/0157064 A1 | 6/2011 | Imai | |

FOREIGN PATENT DOCUMENTS

| | | |
|---|---|---|
| JP | 2006-079405 A | 3/2006 |
| WO | 2010/024179 A1 | 3/2010 |

OTHER PUBLICATIONS

Official Communication issued in International Patent Application No. PCT/JP2012/054380, mailed on May 29, 2012.  
Haga et al., "Touch Panel Embedded IPS-LCD with Parasitic Current Reduction Technique", SID 10 Digest, 2010, pp. 669-672.

* cited by examiner

*Primary Examiner* — Amare Mengistu  
*Assistant Examiner* — Joseph G Rodriguez  
(74) *Attorney, Agent, or Firm* — Keating & Bennett, LLP

(57) ABSTRACT

A touch panel includes a plurality of drive lines and a plurality of sense lines, a sampling switch connected to the sense lines, and an integral circuit connected to the sense lines through the sampling switch. The sampling switch is arranged to keep an on- or off-state for a certain time from a moment at which a voltage of a source bus line is changed.

7 Claims, 10 Drawing Sheets

| STEP | SW41 0 | SW41 1 | SW 44 | OPERATION |
|---|---|---|---|---|
| A | X | — | X | RESET |
| B | — | — | — | DEAD TIME |
| C | — | X | — | CHARGE TRANSFER |
| D | — | — | — | DEAD TIME |
| E | X | — | — | HOLD |
| F | X | — | — | MEASURE |

*X: SW ON
—: SW OFF

TOUCH PANEL EQUIPPED DISPLAY DEVICE AND DRIVING METHOD FOR THE SAME

BACKGROUND OF THE INVENTION

1. Field of the Invention

The present invention relates to a display device including a capacitance-type touch panel, and to a driving method for the display device.

2. Description of the Related Art

Display devices equipped with capacitance-type touch panels, such as an i-Phone (registered trademark) and an i-Pad (registered trademark) made by Apple Inc., have been more and more widely used in recent years. In a capacitance-type touch panel, a detection output is generated due to a difference in electrode coupling capacitance between when a finger is not touching and when a finger is touching the panel.

A typical example of a related-art display device equipped with a capacitance-type touch panel will be described below with reference to FIG. 19. FIG. 19 is a schematic sectional view illustrating a fundamental structure of a related-art liquid crystal display device equipped with a capacitance-type touch panel. As illustrated in FIG. 19, a liquid crystal display device 101 of the related art is constituted by successively stacking a liquid crystal panel (LCD: Liquid Crystal Display) 110, a touch panel (TP) 120, and a cover glass 130. The touch panel 120 is disposed above the liquid crystal panel 110 with an air gap interposed between them. When an observer's finger 102 touches the cover glass 130, a capacitance is formed between the finger 102 and an electrode in the touch panel 120.

Furthermore, cost reduction, a thinner module, lighter weight, and a more sophisticated function have recently been demanded for touch panels, and an integral (In Cell) structure of a touch panel and a display device has been developed to realize those demands. In the future, it is estimated that, for example, a touch panel integrated with a liquid crystal display device will be constituted without requiring an air gap between the touch panel and the liquid crystal panel, and that a distance between a touch function layer of the touch panel and the liquid crystal panel will be shorter.

When the capacitance-type touch panel is constituted in the integral (In Cell) structure as described above, the touch panel is strongly affected by noise generated by the liquid crystal panel. In other words, when the touch panel performs a detection operation while the liquid crystal panel displays an image, radiation noise generated from the liquid crystal panel adversely affects detection sensitivity of the touch panel. In view of such a situation, a technique for reducing the influence of noise from the liquid crystal panel is developed to prevent degradation in performance of the capacitance-type touch panel.

According to the technique disclosed in Hiroshi Haga et al. ("Touch Panel Embedded IPS-LCD with parasitic Current Reduction Technique", SID 2010, pp. 669-672), for example, a frame is time-divided such that the touch panel is driven during a period in which the liquid crystal panel is in a state not driven for display (i.e., during a period between frames in which any display operation is not performed), thereby reducing noise received by the touch panel from the liquid crystal panel.

However, with the technique disclosed in Haga et al., there is an upper limit in a sensing time of the touch panel because of the necessity of securing a display period (about 14 ms) of one frame. Accordingly, a level of a signal detected by the touch panel is reduced and the performance of the touch panel cannot be effectively improved.

Furthermore, with the technique disclosed in Haga et al., because the touch panel is driven by utilizing the period between frames in which any display operation is not performed, the frequency of a coordinate output in the touch panel is limited to 60 Hz. For example, in order to detect a high-speed input entered with a handwritten input using a pen or the like, the frequency of the coordinate output is generally required to be no lower than 180 Hz to 240 Hz. Thus, the technique disclosed in Haga et al. is not adaptable for such high-speed driving of the touch panel.

SUMMARY OF THE INVENTION

Preferred embodiments of the present invention provide a touch panel equipped display device in which an influence of noise is reduced or prevented, and detection accuracy is increased without being restricted in frequency of a coordinate output in the touch panel.

As a result of conducting intensive studies with an intent to solve the above-described problems, the inventors have discovered that radiation noise is generated at the moment at which a voltage supplied to a data signal line is changed in a display panel of a display device.

One preferred embodiment of the present invention provides a touch panel equipped display device including a display panel and a capacitance-type touch panel arranged on an observer-facing surface of the display panel or disposed in the display panel, the display panel including: a plurality of data signal lines and a plurality of scan signal lines, which are arranged to extend perpendicularly or substantially perpendicularly to each other; and a data signal line driving circuit arranged to successively supply a voltage to the plural data signal lines one by one, the touch panel including: a plurality of transmission electrodes and a plurality of reception electrodes, which are arranged to extend perpendicularly or substantially perpendicularly to each other; an integral circuit; a switching element arranged to connect any one of the plural reception electrodes to the integral circuit; and a controller arranged and programmed to change on- and off-states of the switching element at least one or more times during a period in which the voltage is supplied to the plural data signal lines, wherein the controller is arranged and programmed to keep the on- or off-state of the switching element for a certain time from a moment at which the data signal line driving circuit changes the voltage.

With the features described above, in the touch panel according to a preferred embodiment of the present invention, when a voltage supplied to the transmission electrode is changed, charges are caused to flow out from the reception electrode. At that time, the switching element is in the on-state such that the reception electrode and the integral circuit are connected to each other. The integral circuit integrates the charges flowing out from the reception electrode, thus enabling the touch panel to detect a touch.

Furthermore, with the features of the preferred embodiment of the present invention described above, the on- and off-states of the switching element are changed over at least one or more times during a period in which the data signal line driving circuit supplies, to the data signal lines, the voltage of a display operation. In other words, the touch panel is driven to perform the touch detection in the display period of the display panel.

Moreover, with the features of the preferred embodiment of the present invention described above, the switching element keeps the on- or off-state for the certain time from the moment at which the voltage of the data signal line is changed.

For example, when the switching element keeps the off-state for the certain time, the reception electrode and the integral circuit are disconnected from each other during a period in which radiation noise is generated. Therefore, the integral circuit is prevented from being affected by the radiation noise.

When the switching element keeps the on-state for the certain time, the integral circuit integrates the charges flowing out from the reception electrode during a period from a time before the generation of the noise to a time after the generation of the noise. Therefore, a potential amplitude $V_{noise}$ of a noise source between an integration start time and an integration end time is 0. Here, a noise quantity $Q_{noise}$ affecting the integral circuit is determined, based on a model formula, as the product of a capacitance $C_{sense-LCD}$ provided between the liquid crystal panel and the reception electrode and the potential amplitude $V_{noise}$ of the noise source between the integration start time and the integration end time. Accordingly, when the potential amplitude $V_{noise}$ of the noise source is 0, the noise quantity $Q_{noise}$ is 0. Hence the integral circuit can integrate the charges flowing out from the reception electrode without being affected by the noise.

With the touch panel equipped display device according to one preferred embodiment of the present invention, as described above, a detection time of the touch panel is sufficiently ensured by driving the touch panel even in the display period of the touch panel so as to reduce or prevent the influence of the noise. As a result, detection accuracy of the touch panel is increased. In addition, since the frequency of an output (coordinate output) of the integral circuit is not restricted to 60 Hz, the touch panel can be suitably adapted for a high-speed input to the touch panel.

According to another preferred embodiment of the present invention, there is provided a driving method of a touch panel equipped display device including a display panel and a capacitance-type touch panel arranged on an observer-facing surface of the display panel or disposed in the display panel, the display panel including: a plurality of data signal lines and a plurality of scan signal lines, which are arranged to extend perpendicularly or substantially perpendicularly to each other; and a data signal line driving circuit arranged to successively supply a voltage to the plural data signal lines one by one, the touch panel including: a plurality of transmission electrodes and a plurality of reception electrodes, which are arranged to extend perpendicularly or substantially perpendicularly to each other; an integral circuit; a switching element arranged to connect any one of the plural reception electrodes to the integral circuit; and a controller arranged and programmed to change over on- and off-states of the switching element at least one or more times during a period in which the voltage is supplied to the plural data signal lines, wherein the controller is arranged and programmed to keep the on- or off-state of the switching element for a certain time from a moment at which the data signal line driving circuit changes the voltage.

The above-described method provides similar advantageous effects to those described above in connection with the touch panel equipped display device according to one preferred embodiment of the present invention.

The touch panel equipped display device according to one preferred embodiment of the present invention includes the display panel and the capacitance-type touch panel arranged on the observer-facing surface of the display panel or disposed in the display panel, the display panel including the plurality of data signal lines and the plurality of scan signal lines, which are arranged to extend perpendicularly or substantially perpendicularly to each other, and a data signal line driving circuit arranged to successively supply the voltage to the plural data signal lines one by one, the touch panel including the plurality of transmission electrodes and the plurality of reception electrodes, which are arranged to extend perpendicularly or substantially perpendicularly to each other, the integral circuit, the switching element arranged to connect any one of the plural reception electrodes to the integral circuit, and the controller arranged and programmed to change over on- and off-states of the switching element at least one or more times during the period in which the voltage is supplied to the plural data signal lines, wherein the controller is arranged and programmed to keep the on- or off-state of the switching element for the certain time from the moment at which the data signal line driving circuit changes the voltage. Therefore, the detection accuracy of the touch panel can be satisfactorily increased.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Examples of a liquid crystal display device according to preferred embodiments of the present invention will be described below with reference to the drawings.

Figure 2:
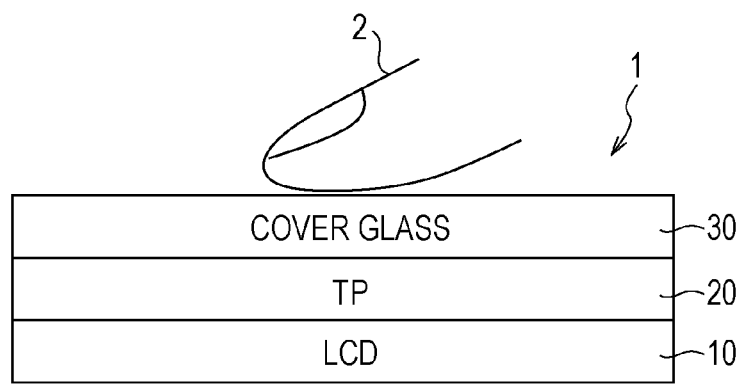
FIG. 2 is a schematic sectional view illustrating a fundamental structure of the touch panel equipped liquid-crystal display device according to one preferred embodiment of the present invention.

FIG. 2 is a schematic sectional view illustrating a fundamental structure of a liquid crystal display device (display device equipped with a touch panel) 1 according to a preferred embodiment of the present invention.

As illustrated in FIG. 2, the liquid crystal display device 1 is preferably defined by successively stacking a liquid crystal panel (LCD: Liquid Crystal Display) 10, a touch panel (TP) 20, and a cover glass 30, for example. The touch panel 20 is disposed directly on a surface of the liquid crystal panel 10, the surface being positioned on the side facing an observer. In other words, an air gap is not present between the liquid crystal panel 10 and the touch panel 20.

In the present preferred embodiment, the touch panel is preferably a capacitance-type touch panel. When an observer's finger 2 touches the cover glass 30 from above, a capacitance is produced between the finger 2 and an electrode in the touch panel 20. In the touch panel 20, whether or not the finger is touched is detected due to a difference in electrode coupling capacitance between when the finger 2 is not touched and when the finger 2 is touched.

Figure 3:
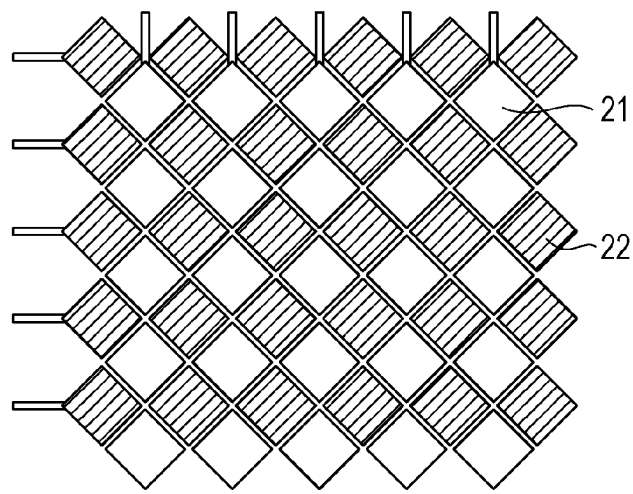
FIG. 3 is a plan view illustrating an electrode shape in the touch panel illustrated in FIG. 2.

FIG. 3 is a plan view illustrating an X electrode (transmission electrode; transmission line; drive line) 21 and a Y electrode (reception electrode; reception line; sense line) 22, which are included in the touch panel 20. As illustrated in FIG. 3, plural X electrodes 21 are arranged on a substrate of the touch panel 20, and plural Y-electrodes are arranged to extend perpendicularly or substantially perpendicularly to the plural X-electrodes 21. The X electrodes 21 and the Y electrodes 22 are each arranged in such a pattern that a wide portion and a narrow portion are alternately arrayed in a direction in which the electrode extends.

Figure 4:
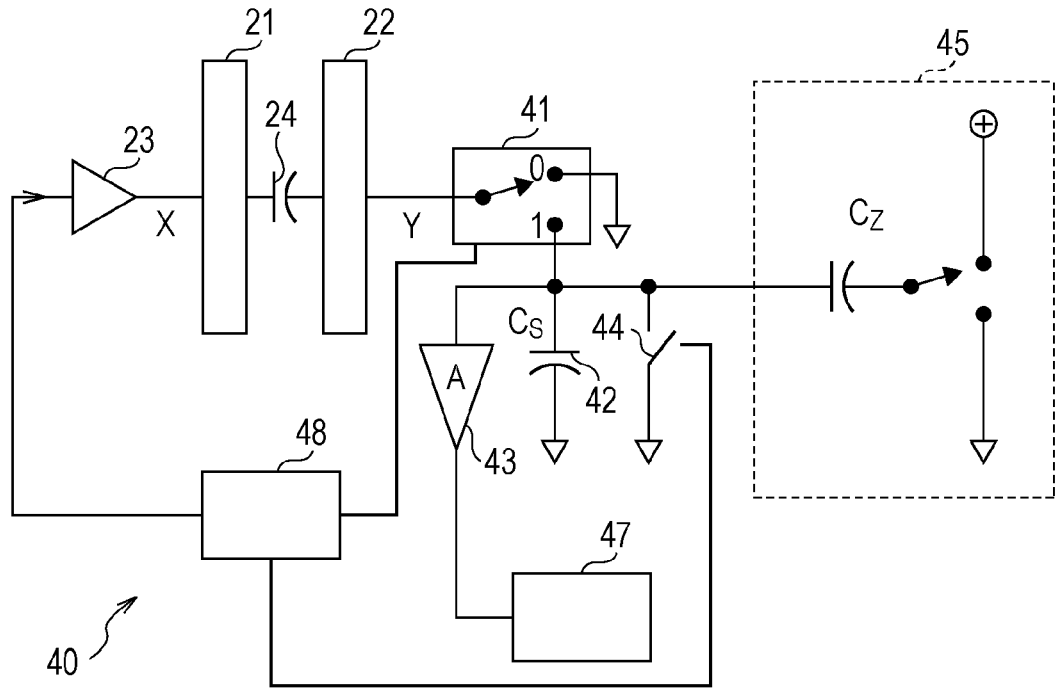
FIG. 4 is a diagram illustrating a detection circuit in the touch panel illustrated in FIG. 2.

FIG. 4 is a diagram illustrating a processing circuit 40 in the touch panel 20.

As illustrated in FIG. 4, the processing circuit 40 preferably includes a signal generator 23 connected to the X electrode 21, a sampling switch 41 connected to the Y electrode 22, an integral circuit 42, an amplifier 43, a reset switch (reset device) 44, a charge cancellation circuit 45, a detector 47, and a timing controller 48. Furthermore, in the present preferred embodiment, the touch panel 20 is preferably of the mutual capacitance-type in which the X electrode 21 and the Y electrode 22 are coupled to each other through a capacitance 24.

The processing circuit 40 illustrated in FIG. 4 typically represents the processing circuit corresponding to respective arbitrary ones of the plural X electrodes 21 and the plural Y electrodes 22 illustrated in FIG. 3. Stated in another way, it is assumed in the present preferred embodiment that the sampling switch 41, the integral circuit 42, the amplifier 43, the reset switch 44, and so on are preferably disposed corresponding to each of the plural Y electrodes 22. The plural Y electrodes 22 are each connected to the integral circuit 42 through the sampling switch 41. The detector 47 is preferably provided by a plurality of elements each of which is respectively disposed such that it can be connected to a different one of the integral circuits 42 disposed in the processing circuit 40. In other words, the detector 47 is preferably disposed for each processing circuit 40, i.e., for each Y electrode 22. However, the preferred embodiments of the present invention are not limited to the above-described arrangement, and one detector 47 may be provided by a single element which is common to the plural Y electrodes 22.

The signal generator 23 outputs a cyclic voltage signal to the X electrode. When the voltage signal supplied to the X electrode is changed from an H level (high level) to an L level (low level) or from an L level to an H level, a current is caused to flow in the Y electrode 22.

The sampling switch 41 is preferably disposed between the Y electrode 22 and the integral circuit 42. When the signal generator 23 changes the voltage signal from the L level to the H level, the sampling switch 41 is kept in a state connected to a terminal "1", such that it is turned to an on-state. The Y electrode 22 is thus connected to the integral circuit 42. On the other hand, when the signal generator 23 changes the voltage signal from the H level to the L level, the sampling switch 41 is kept in a state connected to a terminal "0", such that it is turned to an off-state. Thus, the Y electrode 22 is grounded.

When the reset switch 44 is in an on-state, the integral circuit 42 is grounded to reset an integrating capacitor in the integral circuit 42. With the reset switch 44 turned on and off, a detection period in the touch panel 20 is controlled to a predetermined cycle.

Output timing of the voltage signal from the signal generator 23 and on/off timings of the sampling switch 41 and the reset switch 44 are preferably controlled by a timing controller 48.

The integral circuit 42 is preferably defined by, for example, an operational amplifier and an integrating capacitor Cs. The integrating capacitor Cs stores charges flowing through the Y electrode 22 when the sampling switch 41 is turned on. The capacitance 24 is changed between when the finger is not touched and when the finger is touched (the capacitance is reduced when the finger is touched). Thus, the integral circuit 42 outputs a voltage that is proportional to a difference in the coupling capacitance 24 between the X electrode 21 and the Y electrode 22, by integrating a value of the current flowing through the Y electrode 22.

The detector 47 measures a difference in the output voltage of the integral circuit 42, so as to detect whether or not the finger is touched.

It is to be noted that the configuration of the processing circuit 40 is not limited to the above-described one. The touch panel 20 may include the integral circuit 42, the amplifier 43, and the reset switch 44, which are selectively connected to the plural Y electrodes 22. For example, the detailed configuration of the processing circuit 40 may be constructed and operated as described in U.S. Pat. No. 6,452,514.

The operation of the touch panel 20 according to a preferred embodiment of the present invention will be described below with reference to FIGS. 5 and 6.

Figure 5:
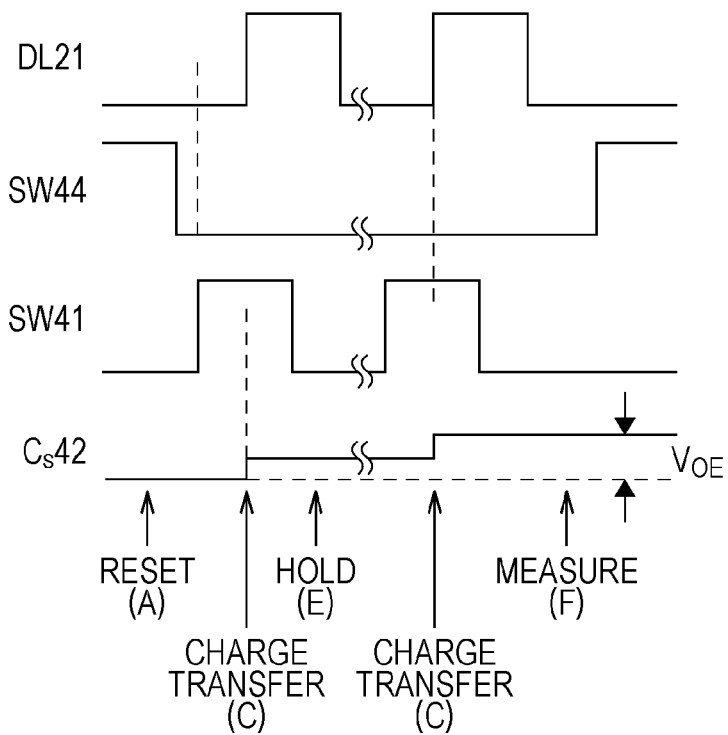
FIG. 5 is a timing chart to explain a basic operation of the touch panel illustrated in FIG. 2.

FIG. 5 illustrates one example of a timing chart to explain the operation of the touch panel 20. FIG. 6 is a table listing operation steps executed in the touch panel 20.

FIG. 5 depicts a waveform of a voltage supplied to one arbitrary X electrode 21. Furthermore, FIG. 5 illustrates examples of respective timing control signals input to the sampling switch 41 and the reset switch 44, and the output voltage of arbitrary one corresponding integral circuit 42.

Figures 6, 7:
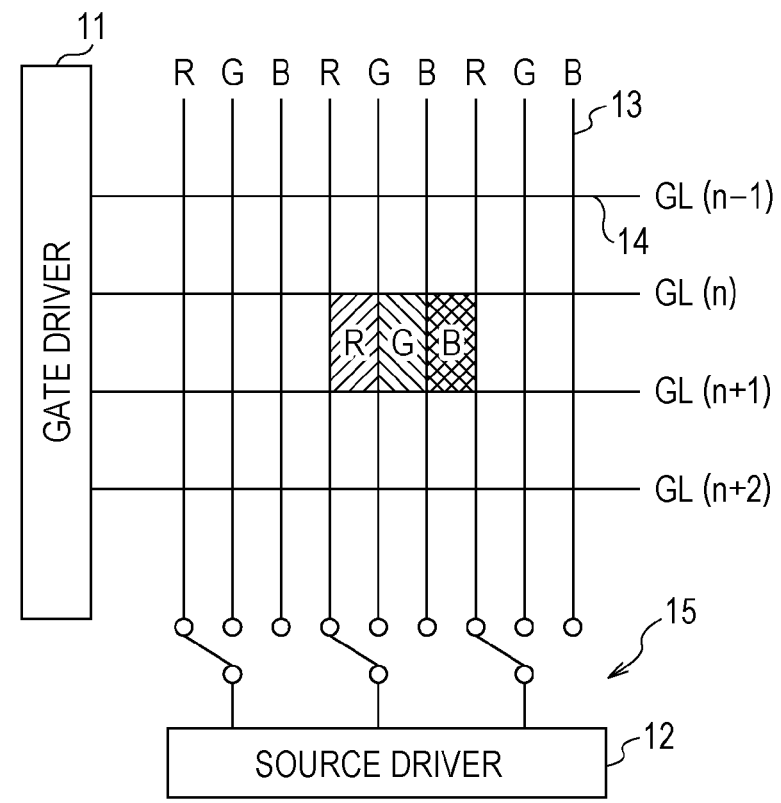
FIG. 6 is a table to explain the basic operation of the touch panel illustrated in FIG. 2.
FIG. 7 is a plan view illustrating an electrode structure in the liquid crystal panel illustrated in FIG. 2.

In FIG. 6, in each of columns for the terminal "0" and the terminal "1" of the sampling switch 41 and for the reset switch 44, a symbol "x" represents a connected state and a symbol "−" represents a non-connected state.

As illustrated in FIGS. 5 and 6, the touch panel 20 repeatedly executes the following steps A to F.

First, the reset switch 44 is turned to the on-state in accordance with the timing control signal. Responsively, the integrating capacitor of the integral circuit 42 is reset to an initial state (e.g., 0 V) (step A).

Then, after the reset switch 44 has been turned to the off-state, the sampling switch 41 is brought into the state connected to the terminal "1" in accordance with the timing control signal during a period including the timing when the voltage signal supplied to the X electrode 21 is changed from the L level to the H level. As a result, the Y electrode 22 is connected to the integral circuit 42 through the terminal "1". During that period, charges flowing out from the Y electrode 22 are transferred to the integrating capacitor of the integral circuit 42 (step C).

Thereafter, the sampling switch 41 is brought into the state connected to the terminal "0" in accordance with the timing control signal, such that the Y electrode 22 is electrically grounded through the terminal "0". As a result, the charges in the integral circuit 42 are held, and the touch panel 20 comes into a hold state (step E).

It is to be noted that the steps B and D are preferably each performed at a dead time during which all the switches and the terminals are in the unconnected state.

In the present preferred embodiment, for any one of the X electrodes 21, the steps B to E are executed at least once, thus performing integration at least once. After the processing for the one X electrode 21 is completed, the reset process is executed. Then, for the next X electrode 21, the steps B to E are preferably executed at least once.

After executing the last charge transfer (step C), the detector 47 measures the output voltage of the integral circuit (step F) while the sampling switch 41 is in the state connected to the terminal "0" and maintains the hold state. After the measurement, the reset switch 44 is turned to the on-state again in accordance with the timing control signal, such that the integral circuit 42 is returned to the step A.

The structure of the liquid crystal panel 10 will be briefly described below with reference to FIG. 7.

FIG. 7 illustrates an electrode structure on an active matrix substrate in the liquid crystal panel 10.

The liquid crystal panel 10 is preferably defined by sandwiching a liquid crystal layer between the active matrix substrate and an opposed substrate, for example. A plurality of source bus lines (data signal lines) 13 and a plurality of gate bus lines (scan signal lines) 14 are arranged on the active matrix substrate. On the active matrix substrate, the plural source bus lines 13 and the plural gate bus lines 14 extend perpendicular or substantially perpendicular to each other such that a display region is divided in the matrix form.

Furthermore, the liquid crystal panel 10 according to the present preferred embodiment is preferably an active matrix liquid crystal panel operating with the SSD (Source Shared Driving) technique. The plural source bus lines 13 are arranged corresponding to respective sub-pixels in three primary colors constituting display colors, i.e., in red (R), green (G), and blue (B). Thus, three plural source bus lines 13 corresponding to R, G, and B are preferably provided as one set. The sub-pixels corresponding to the three primary colors are each arranged at an intersection between the source bus line 13 and the gate bus line 14, so as to define one pixel.

The plural source bus lines 13 are preferably connected per set to a source driver (data signal line drive circuit) 12 through an SSD switch 15. The SSD switch 15 is on/off controlled in accordance with a control signal from a control circuit (not illustrated) such that the plural source bus lines 13 are successively connected to the source driver 12. Stated in another way, the plural source bus lines 13 are supplied per set with data signals (voltage signals) in sequence of RGB.

Moreover, the plural gate bus lines 14 are connected to a gate driver (scan signal line drive circuit) 11. The plural gate bus lines 14 are successively selected by the gate driver 11 such that scan signals are supplied to the plural gate bus lines 14 in sequence.

In the display panel 10, during a period in which one of the gate bus lines 14 is selected, the data signals are supplied from the source bus lines 13 to the pixels, which are connected to the selected gate bus line 14, for writing data into the relevant pixels. The display operation of the display panel 10 is preferably performed in such a manner.

It is to be noted that the respective numbers of source bus lines 13 and gate bus lines 14 in FIG. 7 are illustrated merely by way of example and are not limited to the particular ones shown.

Figure 8:
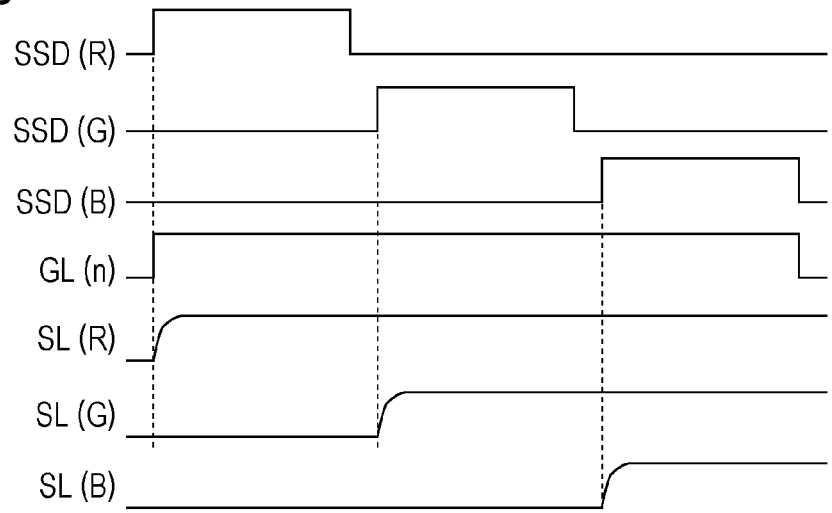
FIG. 8 is a timing chart to explain the basic operation of the liquid crystal panel illustrated in FIG. 2.

The operation of the liquid crystal panel 10 in accordance with a preferred embodiment of the present invention will be described below with reference to FIG. 8. FIG. 8 illustrates one example of a timing chart to explain the operation of the liquid crystal panel 10.

In FIG. 8, SSD(R), SSD(G), and SSD(B) represent control signals for connecting the SSD switch 15 to the source bus lines 13 corresponding to R, G, and B, respectively. GL(n) represents a potential of the n-th gate bus line 14 as one example. SL(R), SL(G), and SL(B) represent potentials of the source bus lines 13 corresponding to the sub-pixels of R, G, and B, respectively.

As illustrated in FIG. 8, a driving method for the liquid crystal panel 10 according to the present preferred embodiment outputs a data signal in a manner of dividing the data signal into three portions during one horizontal scan period. Each SSD switch 15 is turned to an on-state when the control signal is at an H level. More specifically, when the control signal corresponding to one of R, G, and B is at an H level, the SSD switch 15 is connected to the source bus line 13 corresponding to the relevant color. As a result, a desired source voltage is applied to the source bus line 13 that is connected to the source driver 12. At that time, on the selected gate bus line 14, writing is performed on the display pixel that is connected to the relevant source bus line 13.

Figure 9:
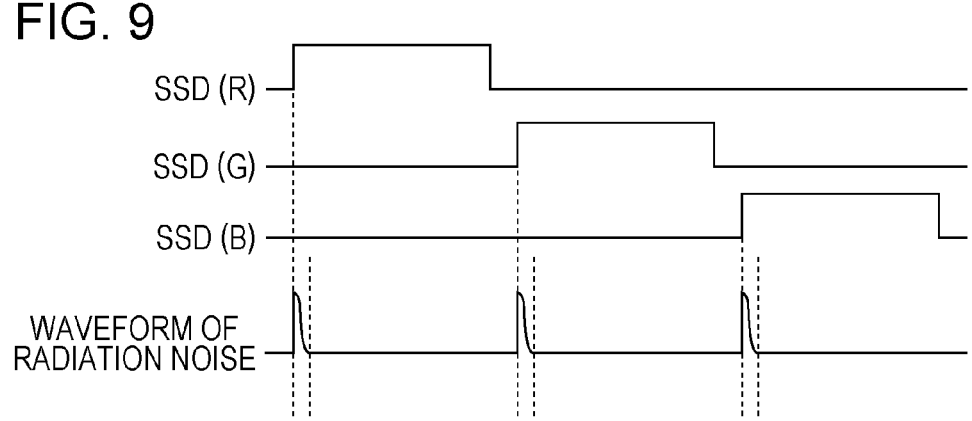
FIG. 9 is a timing chart to explain a waveform of radiation noise generated from the liquid crystal panel.

As a result of analyzing radiation noise generated from the liquid crystal panel 10, the inventors have discovered a waveform of the radiation noise illustrated in FIG. 9. FIG. 9 is a timing chart illustrating waveforms used in driving the liquid crystal panel 10 and the noise waveform. In the liquid crystal panel 10, as illustrated in FIG. 9, the noise is generated at the moment at which the SSD switch 15 is turned on. Thus, the inventors have discovered that the noise is generated at the moment at which the voltage applied to the source bus line 13 is changed.

In the present preferred embodiment, the touch panel 20 can preferably be prevented from being affected by the radiation noise, which is generated from the liquid crystal panel 10, by making driving of the touch panel 20 synchronized with driving of the liquid crystal panel 10. A method of driving the touch panel 20 in synchronism with the liquid crystal panel 10 in order to obtain such an advantageous effect will be described below.

Figure 1:
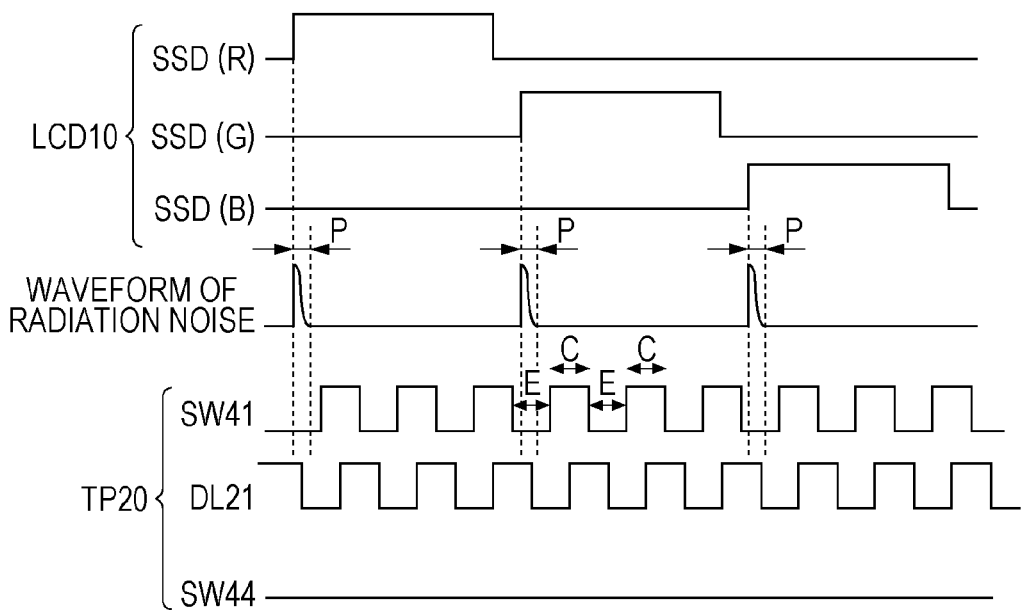
FIG. 1 is a timing chart to explain operations of a liquid crystal panel and a touch panel in a touch panel equipped liquid-crystal display device according to one preferred embodiment of the present invention.

FIG. 1 is a timing chart to explain a driving method for the touch panel 20 according to an example of a preferred embodiment of the present invention ("EXAMPLE 1"). Specifically, FIG. 1 illustrates the timing of synchronizing the operation of the liquid crystal panel 10, illustrated in FIG. 8, with the operation of the touch panel 20, illustrated in FIG. 5.

FIG. 1 illustrates a period during which the steps B to E are repeated in the above-described operation of the touch panel 20. More specifically, with the driving method for the touch panel 20 according to EXAMPLE 1, in a display period of the liquid crystal panel 10, the control signal of the reset switch 44 is kept at the L level, the voltage is successively supplied to each X electrode 21, and the turning-on and -off of each sampling switch 41 are changed over at least one or more times.

Furthermore, with the driving method for the touch panel 20 according to EXAMPLE 1, as illustrated in FIG. 1, the timing control signal of the sampling switch 41 is preferably kept at the L level in the touch panel 20 for an initial time in a period during which the control signal of the SSD switch 15 is at the H level (i.e., during which the SSD switch 15 is in the on-state), namely for an initial time in a period during which the voltage for the display operation is supplied to the source bus line 13 (the initial time being denoted by "P" hereinafter). Stated in another way, in the touch panel 20, the terminal "0" of the sampling switch 41 is connected (off-state) for the initial time (certain time) P, such that the hold state (step E) is kept.

Preferably, the initial time P is set by analyzing a period during which the radiation noise is generated from the liquid crystal panel 10, with the use of an oscilloscope, for example, and by defining the initial time P so as to include the obtained noise generation period. In practice, the initial time P is preferably set to a period of, for example, about 2 μs to about 4 μs from the moment at which the control signal of the SSD switch 15 is changed to the H level, i.e., from the moment at which the voltage applied to the source bus line 13 is changed. However, the initial time P can be set to a shorter period, for example, when the resistance of the opposed electrode in the liquid crystal panel 10 is reduced.

With the driving method according to EXAMPLE 1, therefore, the Y electrode 22 and the integral circuit 42 are preferably kept in the unconnected state during the generation of the radiation noise. Accordingly, for example, even if the Y electrode 22 receives the radiation noise generated from the display panel 10, the integral circuit 42 is not affected by the relevant radiation noise having reached the Y electrode 22. As a result, with the driving method according to EXAMPLE 1, the output voltage of the integral circuit 42 is preferably not affected by the radiation noise while the touch panel 20 is driven in the display period of the display panel 10, such that detection accuracy of the touch panel 20 is increased.

While the period during which the touch panel 20 is kept in the hold state preferably overlaps the initial time P as illustrated in FIG. 1, it may be a period at least just covering the initial time P.

Furthermore, the driving method according to EXAMPLE 1 is preferably realized with the timing controller 48 (control device) controlling the sampling switch 41, the signal generator 23, and the reset switch 44.

Figure 10:
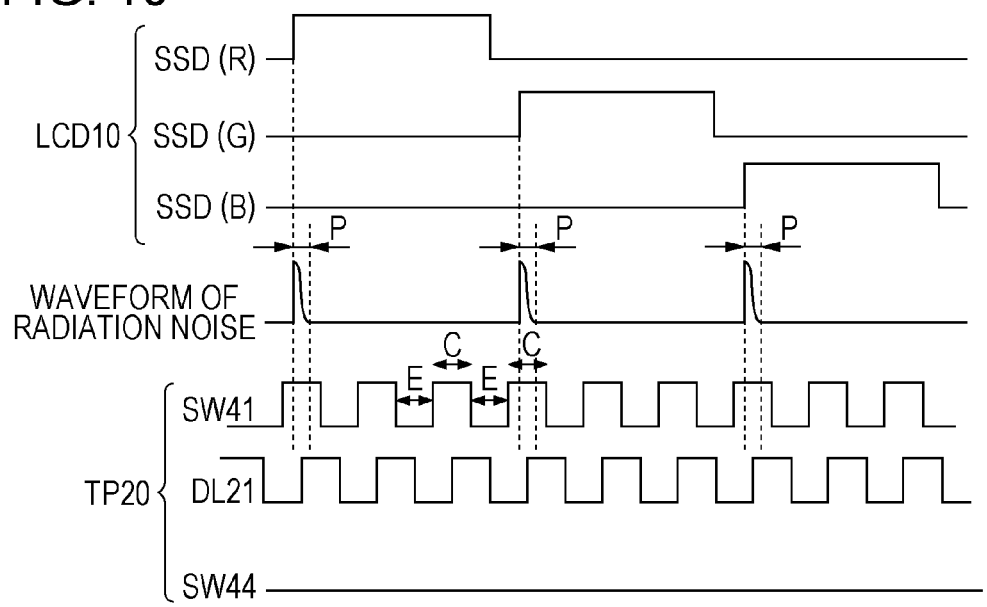
FIG. 10 is another timing chart to explain operations of the liquid crystal panel and the touch panel in the touch panel equipped liquid-crystal display device according to one preferred embodiment of the present invention.

FIG. 10 is a timing chart to explain a driving method for the touch panel 20 according to another example of a preferred embodiment of the present invention ("EXAMPLE 2"). Specifically, FIG. 10 illustrates the timing of synchronizing the operation of the liquid crystal panel 10, illustrated in FIG. 8, with the operation of the touch panel 20, illustrated in FIG. 5.

FIG. 10 illustrates the period during which the steps B to E are repeated in the above-described operation of the touch panel 20. More specifically, with the driving method for the touch panel 20 according to EXAMPLE 2, in the display period of the liquid crystal panel 10, the control signal of the reset switch 44 is kept at the L level, the voltage is successively supplied to each X electrode 21, and the turning-on and -off of each sampling switch 41 are changed over at least one or more times as in EXAMPLE 1.

With the driving method for the touch panel 20 according to EXAMPLE 2, as illustrated in FIG. 10, the timing control signal of the sampling switch 41 is preferably kept at the H level in the touch panel 20 for the initial time P in the liquid crystal panel 10. Stated in another way, in the touch panel 20, the terminal "1" of the sampling switch 41 is connected (on-state) in the initial time P, such that the charge transfer state (step C) is kept. In EXAMPLE 2, therefore, the charges flowing out from the Y electrode 22 are integrated by the integral circuit 42 during a period from a time before the generation of the radiation noise to a time after the generation of the radiation noise.

The remaining matters in EXAMPLE 2 are preferably similar or the same as those described above in EXAMPLE 1. For example, while the period during which the touch panel 20 is kept in the charge transfer state preferably overlaps the initial time P, it may be a period at least just covering the initial time P.

Prior to explaining the advantageous effects of EXAMPLE 2, the influence given to the touch panel 20 by the radiation noise generated from the liquid crystal panel 10 is described below.

In the present preferred embodiment, the opposed electrode of the liquid crystal panel 10 acts as a noise source, and the radiation noise generated from the opposed electrode is applied to the integrating capacitor of the integral circuit 42 through the Y electrode 22 of the touch panel 20. Thus, the influence upon the touch panel 20, which is to be taken into consideration, implies a noise quantity $Q_{noise}$ applied to the integrating capacitor of the integral circuit 42. Accordingly, a model formula for the noise quantity in a simplified model will be described below.

Figure 11:
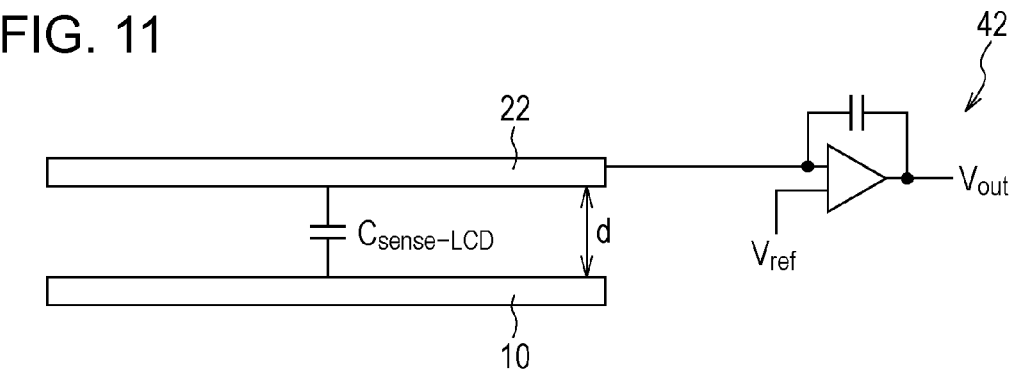
FIG. 11 is an illustration to explain the relationship among the liquid crystal panel, the touch panel, and an integrating capacitor.

FIG. 11 is an illustration to explain the relationship among the liquid crystal panel 10, the Y electrode 22 of the touch panel 20, and the integral circuit 42. As illustrated in FIG. 11, a capacitance $C_{sense-LCD}$ is produced between the opposed electrode or the source bus line of the liquid crystal panel 10 and the Y electrode (sense line) 22 of the touch panel 20. The capacitance $C_{sense-LCD}$ is expressed by the following formula (1).

$$C_{sense-LCD} = \varepsilon \cdot \frac{S_{sense}}{d} \qquad \text{formula (1)}$$

Figure 13:
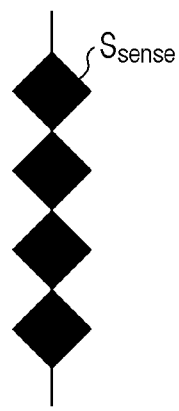
FIG. 13 is an illustration to explain the area of a sense line.

In the formula (1), $S_{Sence}$ denotes an area of one Y electrode 22 illustrated in FIG. 13. Furthermore, d denotes a distance between the opposed electrode of the liquid crystal panel 10 and the Y electrode 22 of the touch panel 20, and $\varepsilon$ denotes a dielectric constant.

Figure 12:
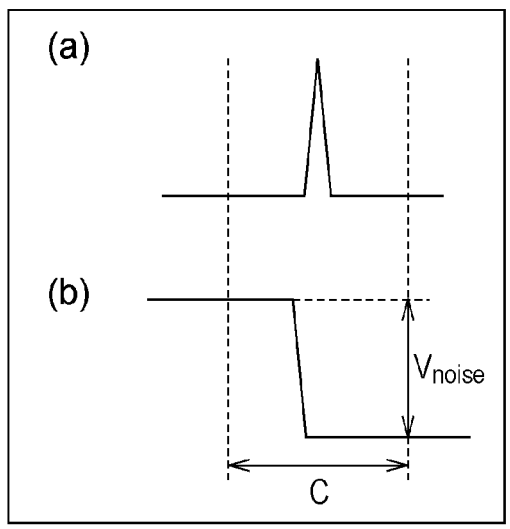
FIG. 12 is a waveform chart to explain the amplitude of noise.

Portions (a) and (b) of FIG. 12 are charts illustrating examples of the waveform of the radiation noise generated from the liquid crystal panel 10. For the sake of explanation, it is assumed here that the radiation noise occurs as illustrated in portions (a) and (b) of FIG. 12 during a period in which the above-mentioned step C is executed in the touch panel 20, i.e., during a period in which the integration is performed by the integral circuit 42.

In (a) of FIG. 12, although the noise occurs, the noise is not generated at both the start time and the end time of the integration by the integral circuit 42. Therefore, a noise voltage amplitude $V_{noise}$ between the integration start time and the integration end time is 0. On the other hand, in (b) of FIG. 12, the noise is generated at the time the integration is started by the integral circuit 42, but the noise is not generated at the integration end time. Therefore, the noise voltage amplitude $V_{noise}$ between the integration start time and the integration end time takes a certain value.

In short, the model formula for the noise quantity $Q_{noise}$ received by the integrating capacitor of the integral circuit 42 is expressed by the following formula (2).

$$Q_{noise} = C_{sense\text{-}LCD} \cdot V_{noise} \quad \text{formula (2)}$$

In EXAMPLE 2, during a period overlapping with the initial time P, the terminal "1" of the sampling switch 41 is connected and the Y electrode 22 is connected to the integral circuit 42. Here, while the noise is generated midway the integration performed by the integral circuit 42, the noise is preferably not generated at the integration start time and a noise level is returned to an initial voltage at the integration end time. Therefore, the noise voltage amplitude $V_{noise}$ between the start time and the end time of the integration by the integral circuit 42 is 0.

Accordingly, the noise quantity $Q_{noise}$ received by the integral circuit 42 in EXAMPLE 2 is 0 based on the above-mentioned formula (2). In other words, with the driving method according to EXAMPLE 2, the output voltage of the integral circuit 42 is not affected by the radiation noise while the touch panel 20 is driven in the display period of the display panel 10. As a result, the detection accuracy of the touch panel 20 is increased.

Figure 14:
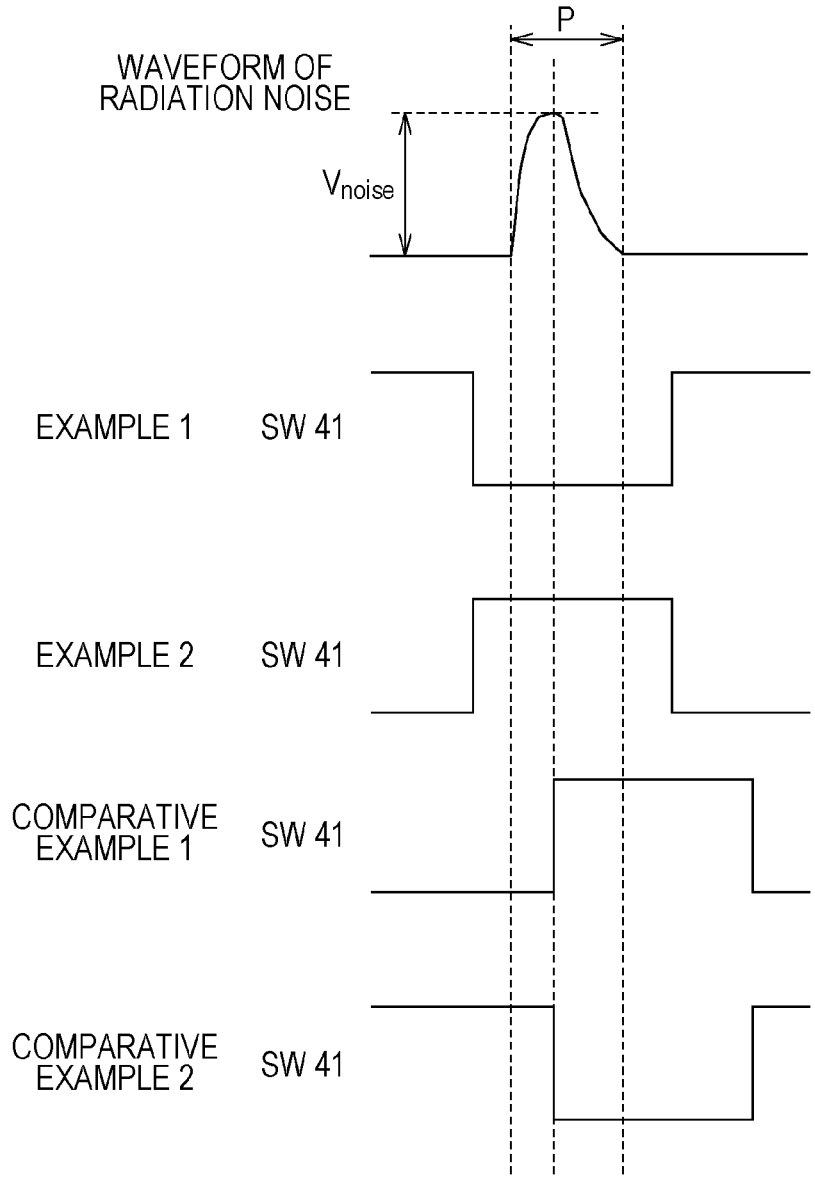
FIG. 14 illustrates the noise waveform and the timing of a switching element.

The operating effects of EXAMPLES 1 and 2 will be described below with reference to FIG. 14 in comparison with comparative examples of embodiments of the present invention ("COMPARATIVE EXAMPLES 1 and 2"). FIG. 14 illustrates, in enlarged scale, the waveform of the radiation noise generated from the liquid crystal panel 10 and the timing control signal of the sampling switch 41 (switching element 41; SW41). It is to be noted that, in FIG. 14, the initial time P during which the radiation noise is generated is illustrated in enlarged scale.

As illustrated in FIG. 14, EXAMPLES 1 and 2 are similar in the fact that the sampling switch 41 is not changed over during the initial time P. On the other hand, in COMPARATIVE EXAMPLES 1 and 2, an operation of changing over the sampling switch 41 is performed during the initial time P.

In more detail, in COMPARATIVE EXAMPLE 1, the timing control signal of the sampling switch 41 is changed from the L level to the H level in the initial time P. Responsively, the connection of the sampling switch 41 is changed over from the terminal "0" to the terminal "1", whereupon the integral circuit 42 starts the integration from some midpoint in the initial time P. Therefore, the noise voltage amplitude $V_{noise}$ between the integration start time and the integration end time takes a certain value. Hence, the noise quantity $Q_{noise}$ received by the integral circuit 42 in COMPARATIVE EXAMPLE 1 takes a value obtained from the above-mentioned formula (2).

In COMPARATIVE EXAMPLE 2, the timing control signal of the sampling switch 41 is changed from the H level to the L level in the initial time P. Responsively, the connection of the sampling switch 41 is changed over from the terminal "1" to the terminal "0", whereupon the integration performed by the integral circuit 42 is ended at some midpoint in the initial time P. Therefore, the noise voltage amplitude $V_{noise}$ between the integration start time and the integration end time takes a certain value. Hence the noise quantity $Q_{noise}$ received by the integral circuit 42 in COMPARATIVE EXAMPLE 2 takes a value obtained from the above-mentioned formula (2).

As seen from the above discussion, in the touch panel 20, by executing the detection operation without changing over the sampling switch 41 in the initial time P, the integrating capacitor of the integral circuit 42 is prevented from receiving the noise while the touch panel 20 is driven in the display period of the display panel 10. The detection accuracy of the touch panel 20 is increased with the above-described detection operation.

According to EXAMPLES 1 and 2, a touch panel driving frequency (i.e., a frequency of the voltage output from the integral circuit 42) is not limited to 60 Hz in the touch panel 20 unlike the related art (e.g., Haga et al.). For example, when a handwritten input using a pen or the like is applied, the touch panel driving frequency is generally needed to be not lower than about 180 Hz to about 240 Hz, for example, because a pen tip moves at a high speed. Thus, the present preferred embodiment is preferentially adaptable for the high-speed input using the pen or the like.

Furthermore, in the related art (e.g., Haga et al.), because a sensing time in the touch panel is assigned through time division of a frame, the sensing time is limited to about 2 ms. In the present preferred embodiment, however, the detection operation (above-described steps A to F) in the touch panel 20 can be executed without needing time division of a frame. For example, when the driving method according to EXAMPLE 1 is applied to a touch panel equipped display device of 10-inch class (without employing SSD), the sensing time (charge transfer time) is expressed by the following formula (3).

$$\text{Sensing time} = \tfrac{1}{60} - \text{GL number} \times \text{initial time } P \quad \text{formula (3)}$$

Accordingly, when the GL number is 768 (XGA=i-pad), the sensing time is 15.9 ms for the initial time P=1 us, 15.1 ms for the initial time P=2 us, and 13.6 ms for the initial time P=4 us, for example. It is thus understood that a longer sensing time than in the related art is ensured, and that sensitivity of the touch panel is increased.

Figure 15:
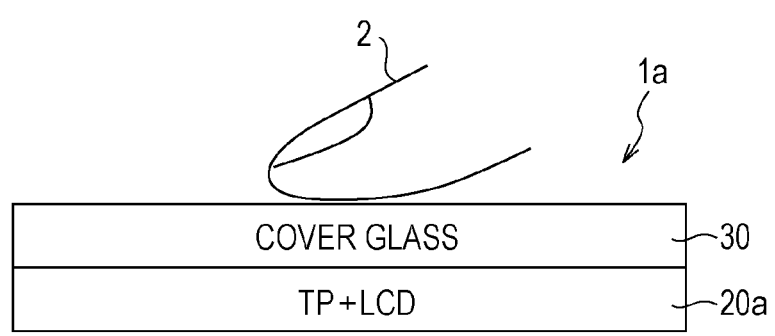
FIG. 15 is a schematic sectional view illustrating a fundamental structure of a liquid crystal display device of the In Cell type in which a touch panel is embedded in a liquid crystal panel.

The preferred embodiments of the present invention are not limited to the liquid crystal display device 1 illustrated in FIG. 2, and it can also be realized as a liquid crystal display device la illustrated in FIG. 15, for example. FIG. 15 is a schematic sectional view illustrating a fundamental structure of the liquid crystal display device la of the In Cell type in which a touch panel is embedded in a liquid crystal panel. As illustrated in FIG. 15, the liquid crystal display device la is defined by stacking a cover glass 30 on a liquid crystal panel 20a equipped with a touch panel 20 in an In Cell structure. The touch panel 20 is embedded as an In Cell panel within the liquid crystal panel 20a. Accordingly, because of no need of arranging a separate touch panel 20 on the surface of the liquid crystal panel 20a, the size of the liquid crystal display device la is reduced.

Figure 16:
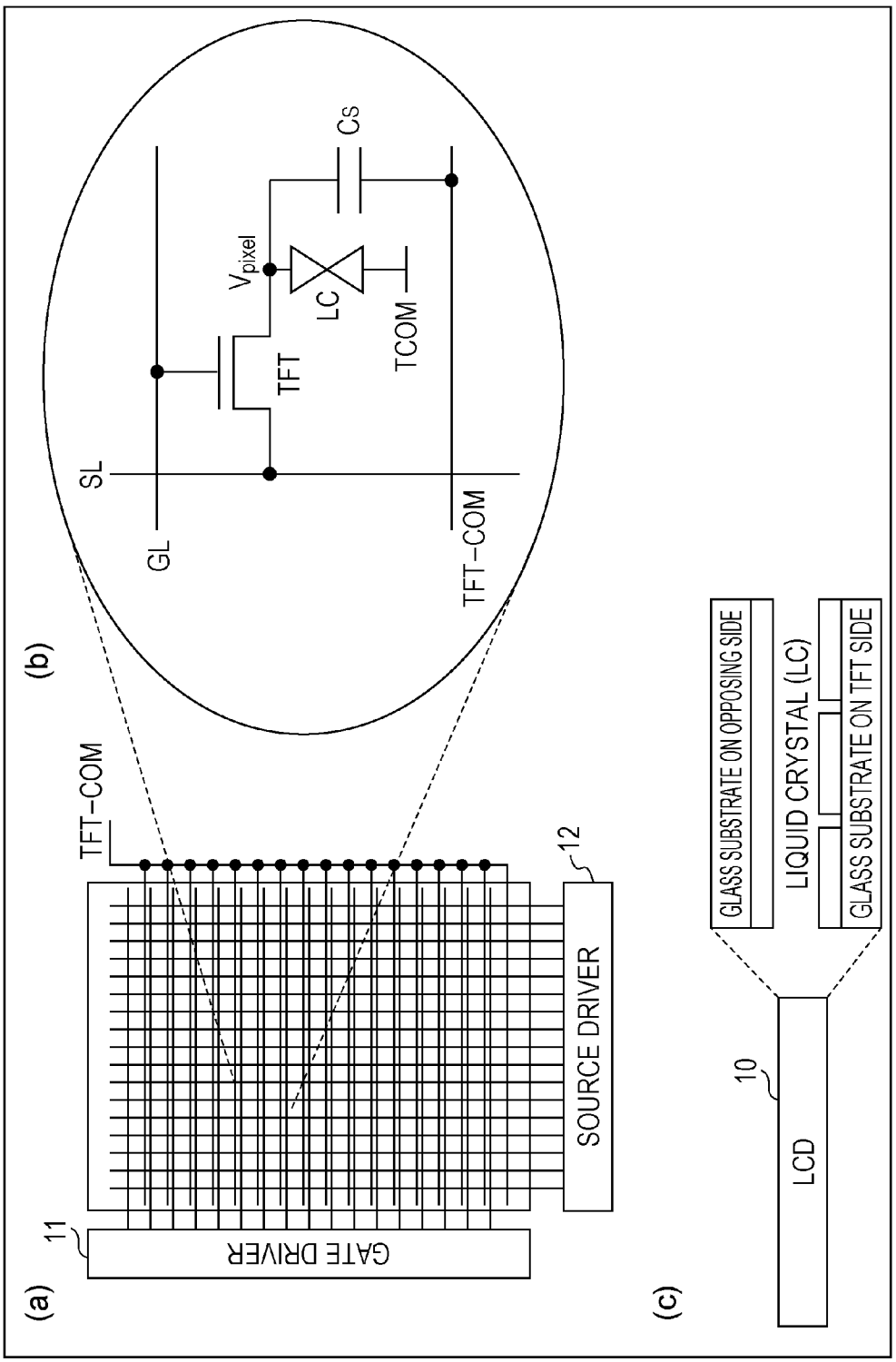
FIG. 16 corresponds to a liquid crystal panel 10 according to a preferred embodiment of the present invention. (a) of FIG. 16 illustrates a plan structure of a liquid crystal panel 10, (b) of FIG. 16 illustrates an equivalent circuit of one pixel in the liquid crystal panel 10, and (c) of FIG. 16 illustrates a cross-section of the liquid crystal panel 10.

Portion (a) of FIG. 16 illustrates a plan structure of a liquid crystal panel 10. Portion (b) of FIG. 16 illustrates an equivalent circuit of one pixel in the liquid crystal panel 10. Portion (c) of FIG. 16 illustrates a cross-section of the liquid crystal panel 10.

As illustrated in (c) of FIG. 16, the liquid crystal panel 10 preferably includes a glass substrate on the opposing side, a glass substrate on the TFT side, and a liquid crystal layer sandwiched between both the substrates. A common electrode (upper electrode) is arranged on a surface of the glass substrate on the opposing side, the surface being positioned to face the liquid crystal layer. A pixel electrode (lower electrode) is arranged on a surface of the glass substrate on the TFT side, the surface being positioned to face the liquid crystal layer. Thus, the liquid crystal layer is sandwiched between the common electrode and the pixel electrode.

As illustrated in (a) of FIG. 16, the liquid crystal panel 10 preferably includes a matrix-like pixel array that is constituted by a plurality of scan signal lines (GL) and a plurality of data signal lines (SL). In (b) of FIG. 16 an equivalent circuit of one pixel is illustrated. In (b) of FIG. 16, TCOM corresponds to the common electrode, and Vpixel corresponds to the pixel electrode. The TCOM is arranged on the glass substrate 51 on the opposing side so as to cover the entire surface of the pixel array. On the other hand, the Vpixel is provided separately, one per pixel. In the liquid crystal panel 10, a certain voltage is applied to the liquid crystal layer (LC) by controlling an electrode voltage applied to the Vpixel.

In the liquid crystal display device 1, an oriented state of the liquid crystal layer is controlled by applying a predetermined voltage between the common electrode and the pixel electrode. As a result, transmittance of light passing through the liquid crystal layer is controlled. At that time, the common electrode (TCOM) is subject to alternating current (AC) driving or direct current (DC) driving. The AC driving and the DC driving in accordance with a preferred embodiment of the present invention will be described below with reference to FIGS. 17 and 18.

Figure 17:
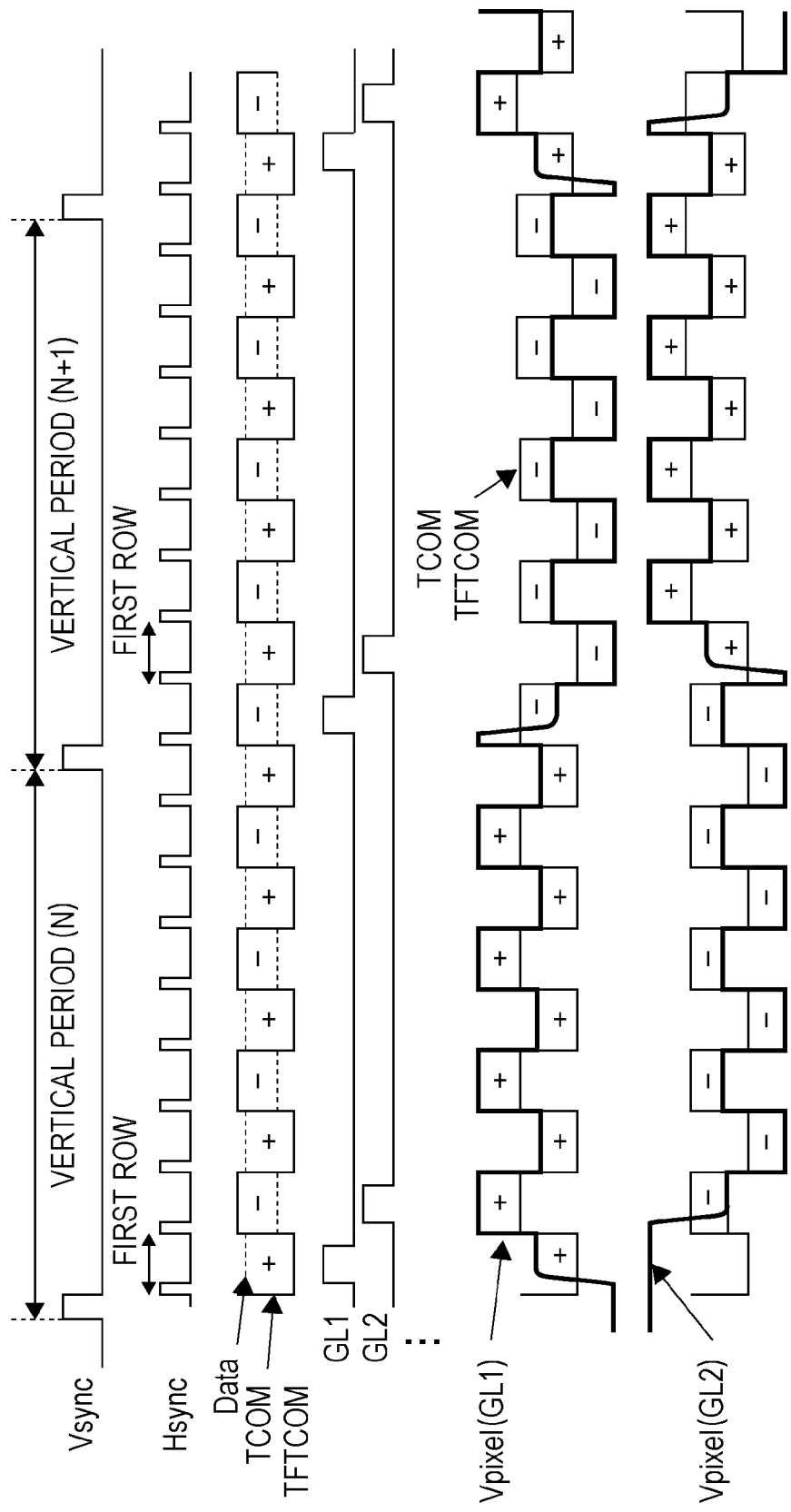
FIG. 17 illustrates waveforms of various voltages when a common electrode of the liquid crystal panel is AC-driven.

FIG. 17 illustrates waveforms of various voltages when the common electrode of the liquid crystal panel 10 is AC-driven. In an example illustrated in FIG. 17, one cycle of a vertical synchronizing signal Vsync corresponds to a period of one frame, and it is usually 1/60 sec, i.e., about 16.6 ms. The gate driver 11 successively scans the scan signals lines (GL) one by one during one frame. At that time, a not-illustrated opposed electrode driver (voltage applying means) applies an AC voltage to the common electrode (TCOM). On the other hand, the source driver 12 applies a voltage with a certain amplitude to the pixel electrode (Vpixel). By applying the voltages as mentioned above, the voltage applied to the liquid crystal layer is controlled. With the AC driving of the TCOM, the amplitude of the voltage applied to the Vpixel is reduced to about a half of that in the later-described DC driving of the TCOM, and hence power consumption is further reduced.

Figure 18:
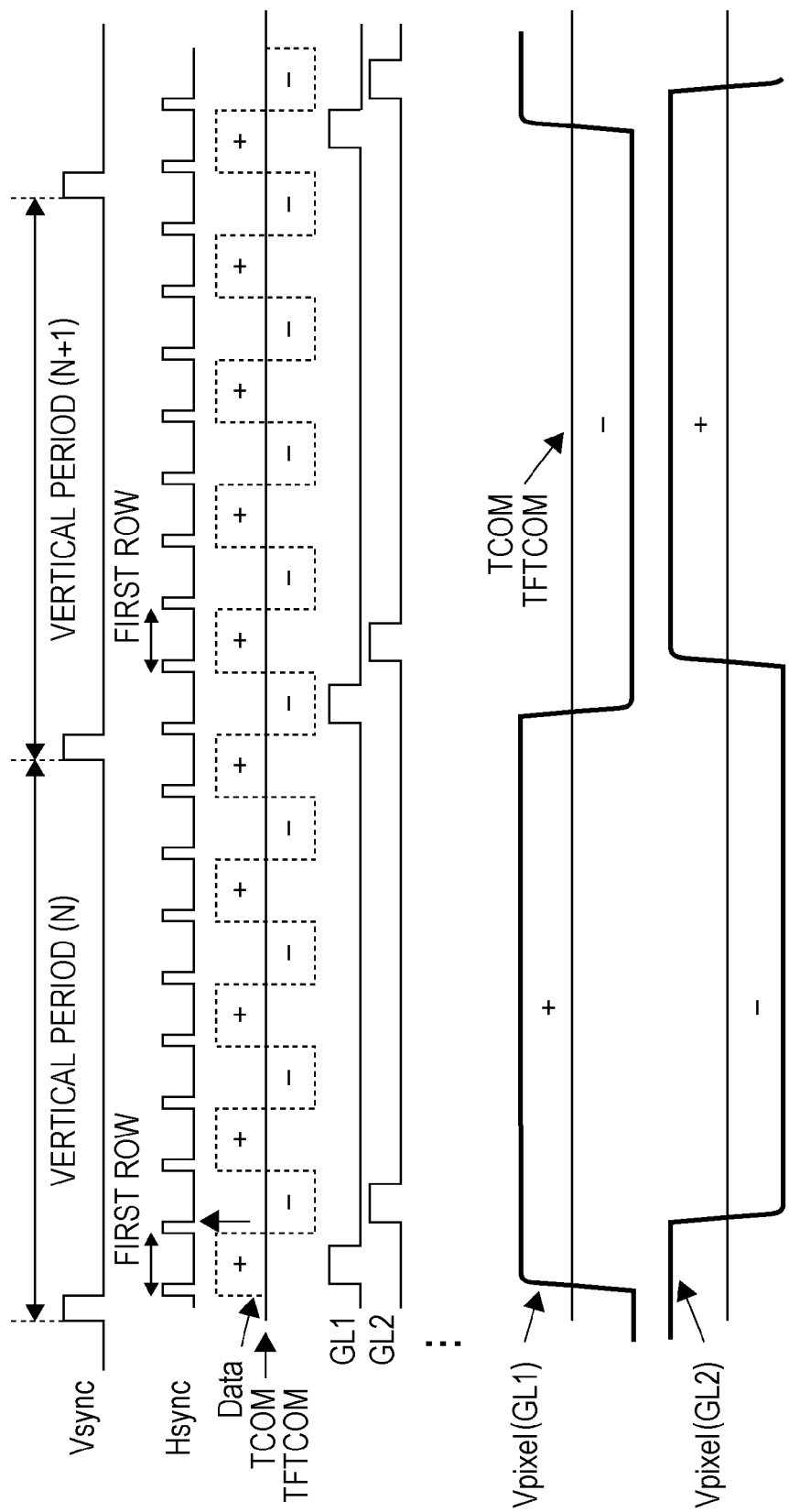
FIG. 18 illustrates waveforms of various voltages when the common electrode of the liquid crystal panel is DC-driven.
Figure 19:
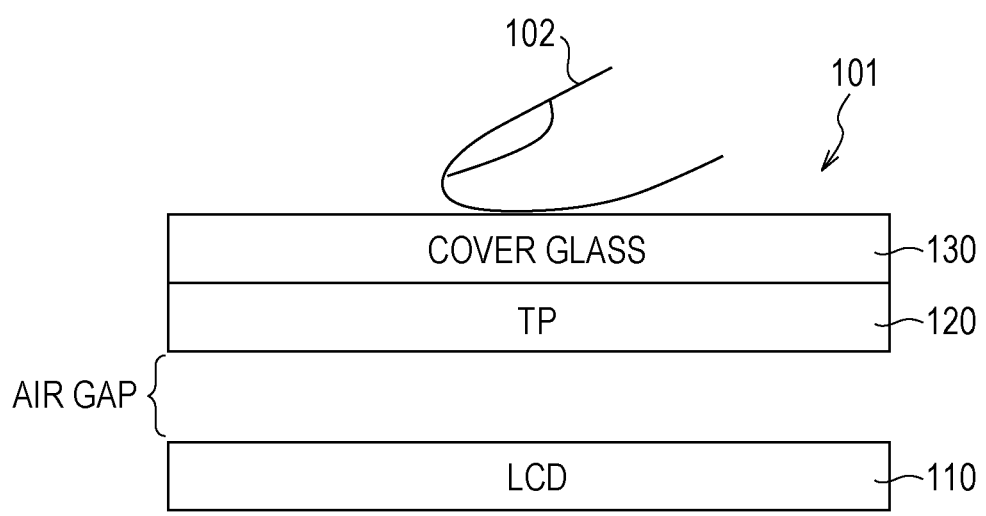
FIG. 19 is a schematic sectional view illustrating a fundamental structure of a related-art liquid crystal display device equipped with a capacitance-type touch panel.

FIG. 18 illustrates waveforms of various voltages when the common electrode of the liquid crystal panel 10 is DC-driven. As illustrated in FIG. 18, the opposed electrode driver preferably applies a DC voltage to the common electrode (TCOM). On the other hand, the source driver 12 applies a voltage with a certain amplitude to the pixel electrode (Vpixel). By applying the voltages as mentioned above, the voltage applied to the liquid crystal layer is controlled. The DC driving of the TCOM can be said to be simpler than the above-described AC driving of the TCOM. However, with the DC driving of the TCOM, the amplitude of the voltage applied to the Vpixel tends to be relatively increased.

Comparing the AC driving and the DC driving of the TCOM, the DC driving is more preferable in the present preferred embodiment of the present invention. The reason is as follows. In the case using the liquid crystal panel 10 in combination with the touch panel 20 as in the present preferred embodiment, when the TCOM is AC-driven, the voltage applied to the TCOM is changed, such that certain noise is generated. The generated noise causes the problem that the detection accuracy of the touch panel 20 is reduced. On the other hand, when the TCOM is DC-driven, the voltage applied to the TCOM is not changed, such that noise is not generated. Accordingly, the detection accuracy of the touch panel 20 is further increased.

While, in the liquid crystal panel 10 according to the preferred embodiments of the present invention, the number of lines connected to the source driver 12 preferably is reduced by employing the SSD technique, preferred embodiments of the present invention are not limited to the above-described one, and the SSD technique may not be employed. In such a case, the initial time P may be set to an initial time in a period from the moment at which the voltage of the source bus line 13 is changed to the moment at which it is changed next.

Furthermore, while the touch panel 20 according to the preferred embodiments of the present invention is preferably the mutual capacitance-type, other preferred embodiments of the present invention may be applied to the self-capacitance-type.

In the touch panel equipped display device according to the preferred embodiments of the present invention, the above-mentioned certain time is preferably previously set depending on the period during which the radiation noise is generated from the display panel. With that feature, the output voltage of the integral circuit is not affected by the radiation noise generated from the liquid crystal display panel, and hence the detection accuracy of the touch panel is further increased.

In the touch panel equipped display device according to the preferred embodiments of the present invention, preferably, the above-mentioned certain time is about 2 μs to about 4 μs, for example.

With such a feature, the influence of the radiation noise generated from the display panel is reduced or prevented more appropriately. Hence, the detection accuracy of the touch panel is increased to a more satisfactory level.

In the touch panel equipped display device according to the preferred embodiments of the present invention, preferably, the display panel further includes a device arranged to generate a synchronizing signal, and the touch panel is operated in accordance with the synchronizing signal.

With that feature, the integrating capacitor of the integral circuit is prevented from being affected by the noise while the touch panel is operated in the display period of the display panel. Therefore, the detection accuracy of the touch panel is further increased.

In the touch panel equipped display device according to the preferred embodiments of the present invention, preferably, the touch panel is a touch panel of mutual capacitance-type.

With that feature, a display device including the touch panel of mutual capacitance-type with high detection accuracy is realized.

In the touch panel equipped display device according to the preferred embodiments of the present invention, preferably, the display panel further includes an SSD switch.

With that feature, an SSD type display device including the touch panel with high detection accuracy is realized.

The touch panel equipped display device according to the preferred embodiments of the present invention preferably further includes a voltage applying device arranged to apply a DC voltage to the opposed electrode of the display panel.

With that feature, since noise attributable to change in potential of the opposed electrode is not generated, an advantageous effect is obtained in that the detection accuracy of the touch panel is further increased.

The present invention is not limited to the above-described preferred embodiments, and the present invention can be variously modified within the scope defined in claims. Other preferred embodiments obtained by combining the technical elements and features disclosed with respect to the above-described different preferred embodiments with each other, as appropriate, are also involved within the technical scope of the present invention.

Preferred embodiments of the present invention and modifications thereof can be suitably applied to a display device equipped with a touch panel, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A touch panel equipped display device comprising:
a display panel and a capacitance-type touch panel arranged on an observer-facing surface of the display panel or disposed in the display panel,
the display panel including:
   a plurality of data signal lines and a plurality of scan signal lines, which are arranged to extend perpendicularly or substantially perpendicularly to each other; and
   a data signal line driving circuit arranged to successively supply a voltage to the plurality of data signal lines one by one,
the touch panel including:
   a plurality of transmission electrodes and a plurality of reception electrodes, which are arranged to extend perpendicularly or substantially perpendicularly to each other;
   an integral circuit;
   a switching element arranged to connect any one of the plurality of reception electrodes to the integral circuit; and
   a controller arranged and programmed to change over on- and off-states of the switching element at least one or more times during a period in which the voltage is supplied to the plurality of data signal lines; wherein
the controller is arranged and programmed to keep the on- or off-state of the switching element for a certain time from a moment at which the data signal line driving circuit changes the voltage;
the controller is further arranged and programmed to change the on- and off-state of the switching element more than once during one horizontal scan period; and
the display panel further includes an SSD switch and the controller is arranged and programmed to change the on- and off-state of the switching element more than once during a period within the one horizontal scan period, the period within the one horizontal scan period corresponding to a time during which the SSD switch is connected to one of the plurality of data signal lines which corresponds to a particular one of different colors of the display device.

2. The touch panel equipped display device according to claim 1, wherein the certain time is previously set depending on a period during which radiation noise is generated from the display panel.

3. The touch panel equipped display device according to claim 1, wherein the certain time is about 2 s to about 4 s.

4. The touch panel equipped display device according to claim 1, wherein
the display panel further includes a generating device arranged to generate a synchronizing signal; and
the touch panel is operated in accordance with the synchronizing signal.

5. The touch panel equipped display device according to claim 1, wherein the touch panel is a touch panel of mutual capacitance-type.

6. The touch panel equipped display device according to claim 1, further comprising a voltage applying device arranged to apply a DC voltage to an opposed electrode of the display panel.

7. A driving method for a touch panel equipped display device including a display panel and a capacitance-type touch panel arranged on an observer-facing surface of the display panel or disposed in the display panel,
the display panel including:
   a plurality of data signal lines and a plurality of scan signal lines, which are arranged to extend perpendicularly or substantially perpendicularly to each other; and
   a data signal line driving circuit arranged to successively supply a voltage to the plural data signal lines one by one,
the touch panel including:
   a plurality of transmission electrodes and a plurality of reception electrodes, which are arranged to extend perpendicularly or substantially perpendicularly to each other;
   an integral circuit;
   a switching element arranged to connect any one of the plural reception electrodes to the integral circuit; and
   a controller arranged and programmed to change over on- and off-states of the switching element at least one or more times during a period in which the voltage is supplied to the plural data signal lines; wherein
the controller is arranged and programmed to keep the on- or off-state of the switching element for a certain time from a moment at which the data signal line driving circuit changes the voltage;
the controller is further arranged and programmed to change the on- and off-state of the switching element more than once during one horizontal scan period; and
the display panel further includes an SSD switch and the controller is arranged and programmed to change the on- and off-state of the switching element more than once during a period within the one horizontal scan period, the period within the one horizontal scan period corresponding to a time during which the SSD switch is connected to one of the plurality of data signal lines which corresponds to a particular one of different colors of the display device.

* * * * *